US009746390B2

(12) United States Patent
Schoot Uiterkamp et al.

(10) Patent No.: US 9,746,390 B2
(45) Date of Patent: Aug. 29, 2017

(54) MICROFUSED SILICON STRAIN GAUGE (MSG) PRESSURE SENSOR PACKAGE

(71) Applicant: Sensata Technologies, Inc., Attleboro, MA (US)

(72) Inventors: Ernie Johannus Antonius Schoot Uiterkamp, Heeten (NL); Dedde Hedzer Wiersma, Deventer (NL); Frank Hendri Jacobs, Broekland (NL)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 131 days.

(21) Appl. No.: 14/632,124

(22) Filed: Feb. 26, 2015

(65) Prior Publication Data

US 2016/0252418 A1 Sep. 1, 2016

(51) Int. Cl.
*G01L 9/00* (2006.01)
*G01L 9/14* (2006.01)
*G01L 19/14* (2006.01)
*G01L 19/00* (2006.01)

(52) U.S. Cl.
CPC ............ *G01L 9/0051* (2013.01); *G01L 9/006* (2013.01); *G01L 19/0038* (2013.01); *G01L 19/14* (2013.01); *G01L 19/145* (2013.01)

(58) Field of Classification Search
None
See application file for complete search history.

(56) References Cited

U.S. PATENT DOCUMENTS

| 2006/0042393 A1* | 3/2006 | Kaneko ................. G01L 19/148 73/753 |
| 2006/0042394 A1* | 3/2006 | Kosh ..................... G01L 9/0051 73/753 |
| 2006/0042395 A1* | 3/2006 | Lepine .................... G01L 9/02 73/753 |
| 2011/0290030 A1* | 12/2011 | Willner ............... G01L 19/0627 73/720 |

(Continued)

FOREIGN PATENT DOCUMENTS

| EP | 1560012 A1 | 8/2005 |
| WO | 03100371 A1 | 12/2003 |

(Continued)

OTHER PUBLICATIONS

Extended European Search Report for EP16156390.3, "Microfused Silicon Strain Gauge (msg) Pressure Sensor Package", date of mailing Jul. 22, 2016.

*Primary Examiner* — Andre Allen
(74) *Attorney, Agent, or Firm* — Burns & Levinson LLP; George N. Chaclas

(57) ABSTRACT

Methods and apparatus for a microfused silicon strain gauge pressure sensor. A pressure sensor package includes a sense element configured to be exposed to a pressure environment, the sense element including at least one strain gauge, an electronics package disposed on a carrier and electrically coupled to the sense element, the carrier disposed on a port that includes the sense element, the port enabling a decoupling feature for sealing and parasitic sealing forces and a reduction of a port length, a housing disposed about the sense element and electronics package, and a connector joined to the housing and electrically connected to the electronics package, the connector including an external interface.

18 Claims, 4 Drawing Sheets

(56) References Cited

U.S. PATENT DOCUMENTS

| | | | |
|---|---|---|---|
| 2013/0192379 A1* | 8/2013 | Petrarca | G01L 9/00 73/754 |
| 2013/0248024 A1* | 9/2013 | Dunn | G01L 9/0072 137/551 |
| 2016/0282205 A1* | 9/2016 | Huo | G01L 1/18 |

FOREIGN PATENT DOCUMENTS

| | | |
|---|---|---|
| WO | 2013110045 A1 | 7/2013 |
| WO | 2014132730 A1 | 9/2014 |

* cited by examiner

MICROFUSED SILICON STRAIN GAUGE (MSG) PRESSURE SENSOR PACKAGE

BACKGROUND OF THE INVENTION

The invention relates generally to sensors, and more specifically to a microfused silicon strain gauge (MSG) pressure sensor package.

In general, state-of-the-art microfused silicon strain gauge pressure (MSG) sensors are used throughout the automotive industry for applications ranging from brake, transmission, cylinder and fuel pressure sensors, to occupant weight force sensing. Such pressure sensors typically consist of silicon strain gauge elements which are glass-bonded to a stainless steel diaphragm. The design of the sensor is such that it provides various signals based on processed sensed conditions.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides methods and apparatus for a microfused silicon strain gauge pressure sensor.

In an aspect, the invention features a pressure sensor package including a sense element configured to be exposed to a pressure environment, the sense element including at least one strain gauge, an electronics package disposed on a carrier and electrically coupled to the sense element, the carrier disposed on a port that includes the sense element, the port enabling a decoupling feature for axial and parasitic sealing forces and a reduction of a port length, a housing disposed about the sense element and electronics package; and a connector joined to the housing and electrically connected to the electronics package, the connector including an external interface.

In another aspect, the invention features a port including a membrane, a thread, a biting edge/sealing edge, and an inner bore hole, a pressure environment extending from the biting edge/sealing edge through the inner bore hole to the membrane, wherein the port enables a decoupling feature for axial and parasitic sealing forces and a reduction of a port length.

Embodiments may have one or more of the following advantages.

The microfused silicon strain gauge pressure sensor of the present invention provides improved sensor performance within a smaller modular sensor package.

The smaller modular sensor package enables improved vibrational performance.

The microfused silicon strain gauge pressure sensor of the present invention enables improved manufacturability (DFMA) and quality by minimizing the number of process steps and components, and making use of low risk processes.

The microfused silicon strain gauge pressure sensor of the present invention enables a deep drawn cup, a port with a trench, clip-in support ring, springs and a package closing by a simple crimping operation.

The microfused silicon strain gauge pressure sensor of the present invention enables vibrational improvement, weight and height reduction, optimized economic productivity while ensuring productivity with fewer components.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The invention will be more fully understood by reference to the detailed description, in conjunction with the following figures, wherein.

DETAILED DESCRIPTION

Figure 1:
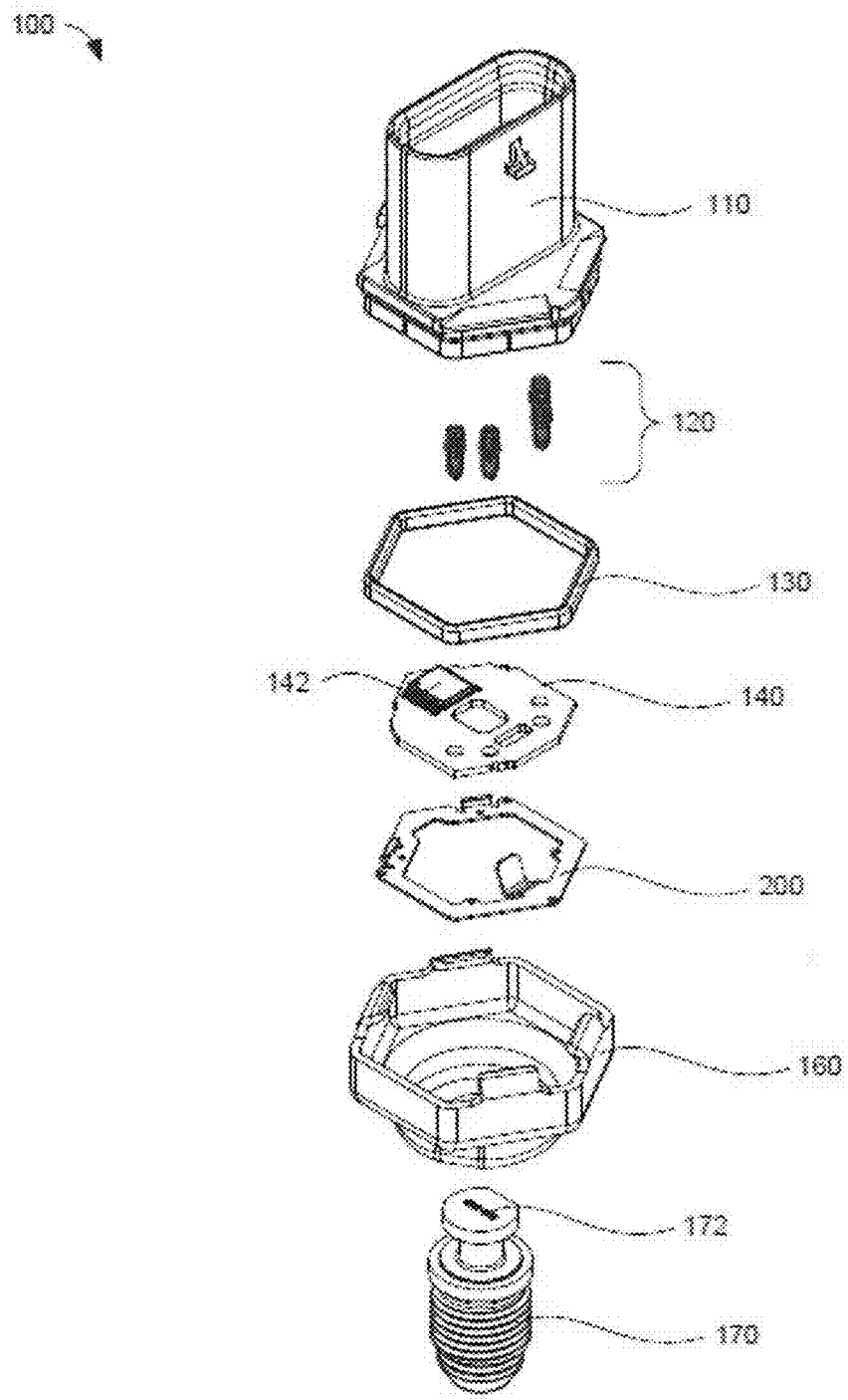
FIG. 1 illustrates a first exemplary pressure sensor package.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

In the description below, the term "or" is intended to mean an inclusive "or" rather than an exclusive "or." That is, unless specified otherwise, or clear from context, "X employs A or B" is intended to mean any of the natural inclusive permutations. That is, if X employs A, X employs B, or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

A sensor package such as, for example, a micro-strain gauge (MSG) device, may have an electronic module assembly (EMA). The EMA may be mechanically fixed above a diaphragm in the sensor package for wire-bonding. The EMA may be connected electrically to a housing associated with the sensor package for electromagnetic compatibility (EMC) performance.

Clip-in support rings are used to provide these functions in a device such as, for example, a sensor package. The clip-in support rings may, for example, provide fixation of the EMA by way of a spring force and a reaction force. Moreover, affixing (e.g., spot welding) a clip-in support ring to a housing of the device may, for example, provide a robust mechanical and/or electrical connection to the housing. The electrical connection may provide electrical continuity between the EMA and the housing.

As shown in FIG. 1, an exemplary sensor package 100 may include, for example, a connector 110, one or more contact springs 120, an environmental seal 130, EMA 140, clip-in support ring 200, a housing 160, and a sense element assembly 170.

The connector 110 may connect the sensor package 100 with an external source (e.g., an Electronic Control Unit (ECU)). Connector 110 may include a terminal that may make, for example, electrical contact with an electrical conductor (e.g., an electrical wire) that may be connected to the external source. The terminal may, for example, be used to transfer signals that may be produced by the sensor package 100 to the external source via the electrical conductor. The signals may include, for example, sensor readings that may be made by the sensor package 100.

Contact springs 120 may provide electrical continuity between EMA 140 and, for example, a terminal contained in connector 110. Contact springs 120 may include an electrically conductive material (e.g., silver plating) that may be used to provide the electrical continuity and protect against corrosion.

Environmental seal 130 may provide a seal between, for example, connector 110 and housing 160. Environmental seal 130 may prevent, for example, contaminants (e.g., moisture, dirt), that may potentially affect a performance of the sensor package 100, from entering the sensor package 100.

EMA 140 may include, for example, a circuit board and one or more electronic components 142 (e.g., integrated circuits, transistors, resistors, capacitors, inductors, diodes). The circuit board may be a printed circuit board (PCB). The electronic components may be mounted on the circuit board. The electronic components may, for example, process conditions (e.g., forces) sensed by sense element assembly 170 and/or generate signals based on the sensed conditions. The electronic components may include components that may transfer the generated signals to an external source via a terminal that may be contained in connector 110.

Housing 160 may provide a mounting platform for the clip-in support ring 200. Housing 160 may be made of a metal that may enable clip-in support ring 200 to be affixed (e.g., welded) to the housing 160. In an embodiment, housing 160 is shaped as a hexagonal cup.

Sense element assembly 170, which includes a port with two gages glass bonded to the port, may include provisions for sensing conditions such as, for example, conditions applied to the sensor package 100. Sense element assembly 170 may include for example, strain gauges 172 that may be used to sense various forces that may be applied to the sensor package 100.

Conditions sensed by sense element assembly 170 may be detected by circuitry contained on EMA 140. The circuitry may process the sensed conditions and generate various signals based on the processed sensed conditions. The signals may be transferred from the sensor package 100 to an external source via a terminal contained in connector 110.

Clip-in support ring 200 may be a support ring that may secure EMA 140 in sensor package 100. Specifically, EMA 140 may be loaded onto clip-in support ring 200. Afterwards, clip-in support ring 200 may be affixed to housing 160, thereby, providing a secure support for EMA 140 in sensor package 100.

For MSG devices such as pressure sensor 100, the port is used to transform a pressure into a strain field. The function of the pressure sensor 100 is transforming physical "fluid pressure" into a ratio-metric output voltage, which corresponds to the applied pressure in several automotive applications. On a membrane of the port (top side), gages are glass-bonded and transform a change of a strain field into an electrical output voltage. It is critical that the strain field on top of the port only be affected by the applied pressure, i.e., the design of the port should decouple other forces, such as mounting forces on the threads and/or bottom of the port, from the membrane.

Figure 2:
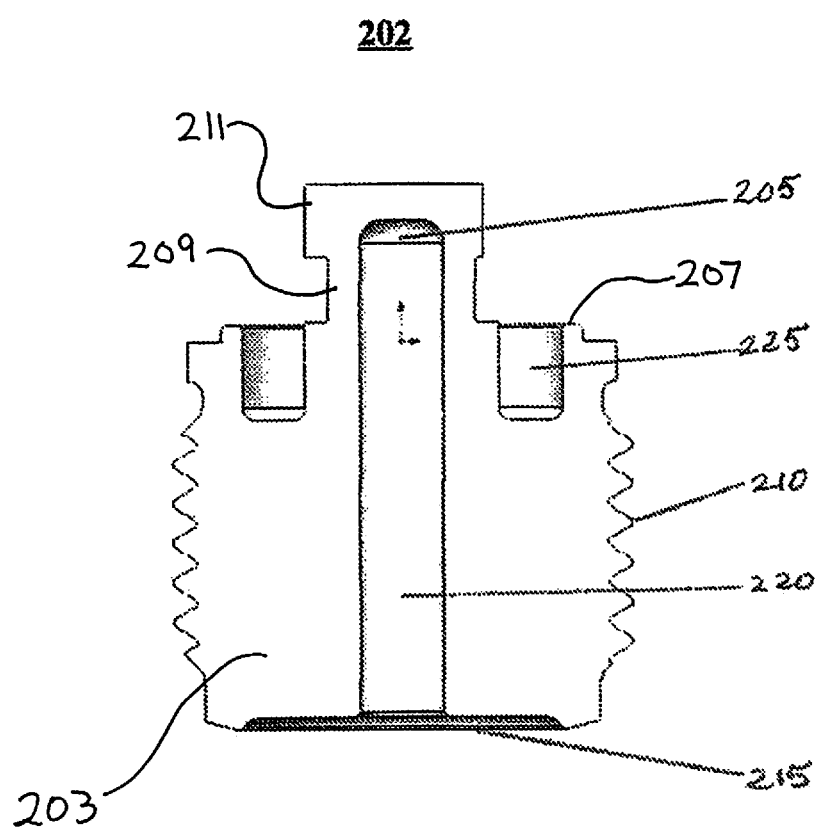
FIG. 2 illustrates a cross-section of a port of the first exemplary pressure sensor package of FIG. 1.

As shown in FIG. 2, an exemplary port 202 includes a membrane 205 (also referred to as a sensing element diaphragm), a thread 210, a biting edge/sealing edge 215, an inner bore hole 220 and a trench port 225. Generally, the port 202 is open to a pressure environment at a bottom thereof. Accordingly, the pressure environment extends from the biting edge/sealing edge 215 through the inner bore hole 220 to the membrane 200. Disposed on a top of the membrane 205 is at least one strain gauge (not shown).

Since the main function of the pressure sensor 100 is measuring pressure, the port 202 should only respond on pressure and not affected by other interaction forces. For example, the port 202 may be mounted in a rail with a mounting torque of up to 100 Nm or higher. The forces that act on a sealing edge 215 must be decoupled from the membrane 205. The strains in the membrane 205 are measured by gages and must only be changed by pressure.

In the prior pressure sensor packages, decoupling forces, such as mounting forces, were achieved by a relatively long port design. The design of the port 202 reduces the port length by implementation of the trench 225. The trench port 225 is a trench added into a shoulder of the port 202. The trench port 225 enables a decoupling feature for axial sealing forces, such as mounting forces on the threads and/or bottom of the port 202, and a reduction of a port length of up to, for example, 2.45 millimeters (mm). More specifically, introduction of the trench port 225 decouples mounting forces while enabling a lower port design compared to older technologies. At the same time, the port 202 with trench port 225, along with cup and connector design, delivers no loss of accuracy by applying sealing forces with the additional of port length reduction, port weight reduction and improved sensor package vibration robustness, and overall reduction on manufacturing cost, i.e., with a shorter port design, more ports can be made from one bar stock of raw material. Thus, a reduced length contributes to a cost reduction in a manufacture of the port 202. Moreover, reduction of the port length of the port 202 reduces the overall length of the sensor. It should also be noted that an overall length of the port 202, and thus the sensor, may be further reduced by reducing a length of the connector 110.

Still referring to FIGS. 1 and 2, the port 202 has a tubular body 203 that defines the biting edge/sealing edge 215 at one end with the other end being a closed membrane 205. Outer threads 210 extend from the biting edge/sealing edge 215 towards a shoulder 207. A central neck portion 209 extends up from the shoulder 207. A distal end 211 of the neck portion 209 has a relatively enlarged diameter. The body defines the central inner bore hole 220 to extend into the distal end 211 to help form the membrane 205. The shoulder 207 defines the annular port trench 225 to extend down adjacent the outer threads 210.

Figure 3:
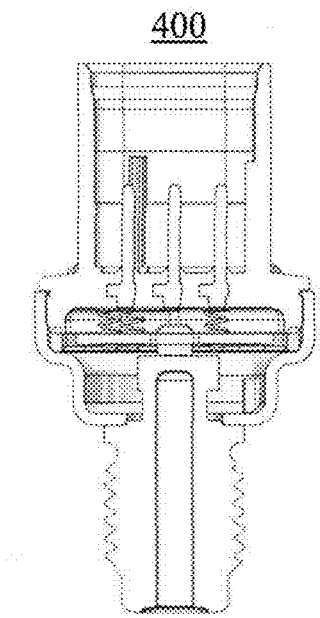
FIG. 3 illustrates another exemplary pressure sensor package.
Figure 4:
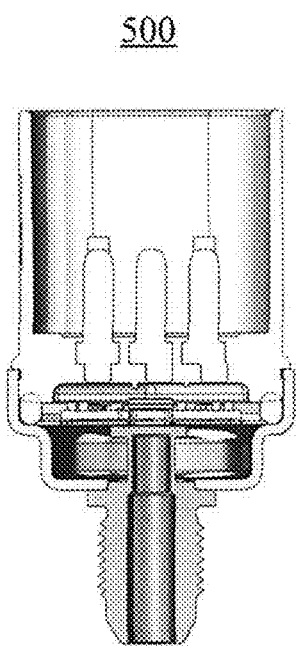
FIG. 4 illustrates another exemplary pressure sensor package.
Figure 5:
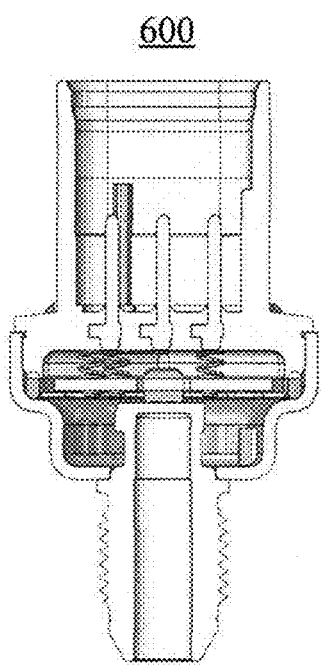
FIG. 5 illustrates another exemplary pressure sensor package.

FIG. 3 illustrates another exemplary pressure sensor package 400, FIG. 4 illustrates another exemplary pressure sensor package 500 and FIG. 5 illustrates another exemplary pressure sensor package 600. As fully described above, the lengths of the ports of each of sensor packages 400, 500 and 600. As the length of the ports are reduced, so is the total lengths of the sensor packages 400, 500, 600.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A pressure sensor package comprising:
   a sense element configured to be exposed to a pressure environment, the sense element including at least one strain gauge;
   an electronics package disposed on a carrier and electrically coupled to the sense element, the carrier disposed on a port that comprises the sense element, the port having a trench for decoupling sealing forces and the port having a reduction of a length of the port;
   a housing disposed about the sense element and electronics package; and
   a connector joined to the housing and electrically connected to the electronics package, the connector including an external interface.

2. The pressure sensor package of claim 1 where in the trench is positioned in a shoulder of the port.

3. The pressure sensor package of claim 1 wherein the reduction of a port length is up to 2.45 millimeters (mm).

4. The pressure sensor package of claim 1 wherein the port is fabricated from a metal, metal alloy, or metallic material.

5. The pressure sensor package of claim 1 wherein the connector comprises a plurality of contacts adapted for making electrical contacts with the electronics package.

6. The pressure sensor package of claim 1 wherein the connector comprises an external interface adapted for external communication.

7. The pressure sensor package of claim 1 wherein the port includes:
   a membrane;
   a thread;
   a biting edge/sealing edge; and
   an inner bore hole, a pressure environment extending from the biting edge/sealing edge through the inner bore hole to the membrane;
   wherein the port has a shoulder that defines the trench.

8. The pressure sensor package of claim 7 wherein further including at least one strain gauge disposed on a top of the membrane.

9. The pressure sensor package of claim 7 wherein the trench is annular.

10. The pressure sensor package of claim 7 wherein the reduction of a port length is up to 2.45 millimeters (mm).

11. The pressure sensor package of claim 7 wherein the port is fabricated from a metal, metal alloy, or metallic material.

12. A pressure sensor package for decoupling sealing forces and to reduce an overall length of the pressure sensor package, the pressure sensor package comprising:
   a port including: a body having outer threads and a shoulder defining at least one trench; a sense element coupled to the body and configured to be exposed to a pressure environment; and an electronics package electrically coupled to the sense element;
   a housing defining a threaded opening coupled to the outer threads of the port; and
   a connector joined to the housing and electrically connected to the electronics package for external interfacing.

13. The pressure sensor package of claim 12 wherein the sense element includes at least one strain gauge.

14. A pressure sensor package for decoupling sealing forces and to reduce an overall length of the pressure sensor package, the pressure sensor package comprising:
   a port including: a body having a biting edge/sealing edge, outer threads extending from biting edge/sealing edge to a shoulder that defines at least one trench, the body also defining a central inner bore hole that terminates in a membrane; a sense element coupled to the body and configured to be exposed to a pressure environment; and an electronics package electrically coupled to the sense element;
   a housing defining a threaded opening coupled to the outer threads of the port; and
   a connector joined to the housing and electrically connected to the electronics package for external interfacing.

15. The pressure sensor package of claim 12 wherein the sense element includes at least one strain gauge.

16. The pressure sensor package of claim 14, wherein the body is tubular with a central neck portion extending up from the shoulder.

17. The pressure sensor package of claim 16, wherein a proximal end of the neck portion that forms the membrane has a relatively enlarged diameter comparted to a diameter of the neck portion.

18. The pressure sensor package of claim 16, wherein the at least one trench is an annular groove concentric with the central inner bore hole and radially inward of the outer threads.

* * * * *